Figure 1:
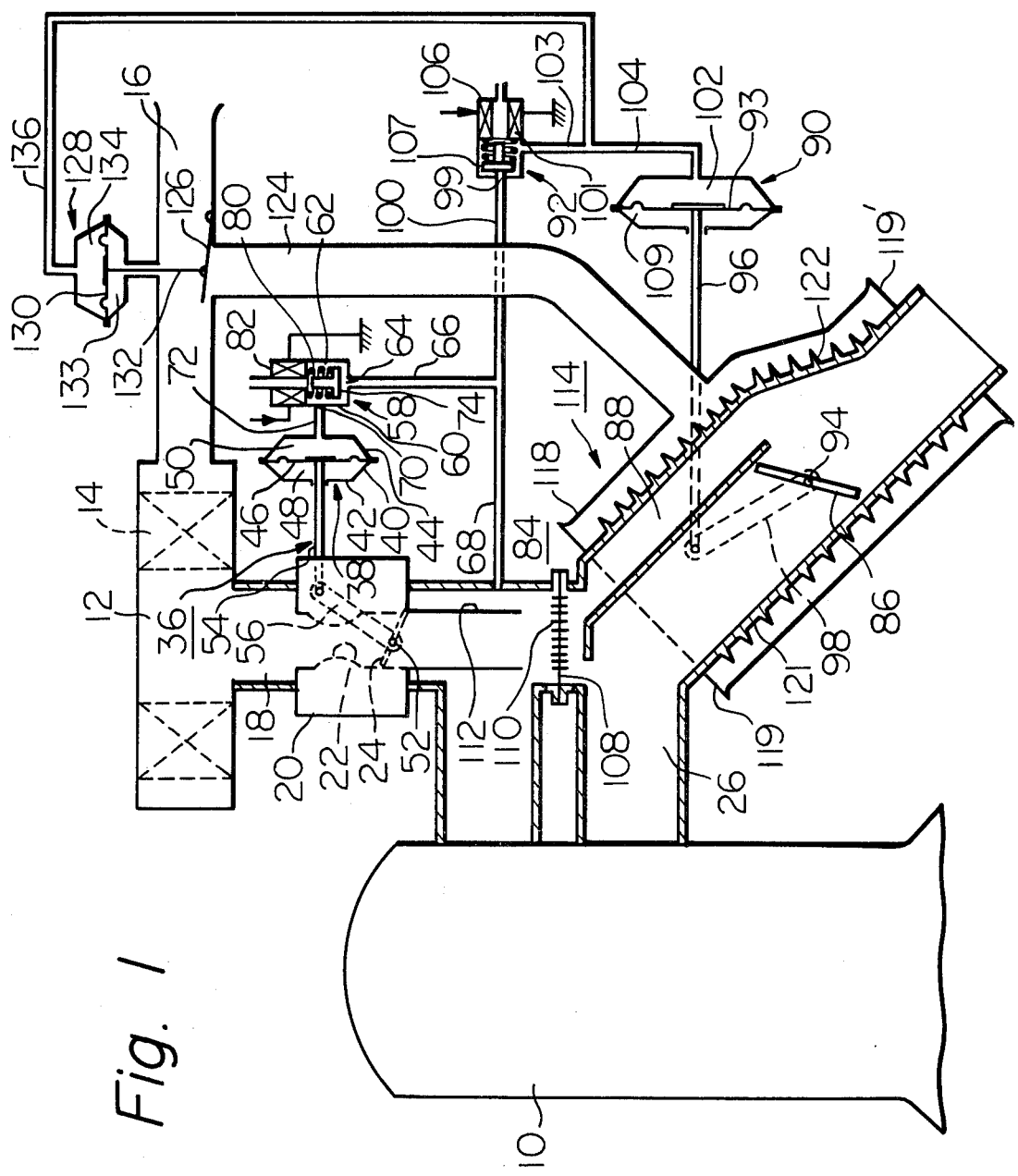

United States Patent [19]

Masaki et al.

[11] 4,079,715
[45] Mar. 21, 1978

[54] WARMING-UP SYSTEM FOR INTERNAL COMBUSTION ENGINES

[75] Inventors: Kenji Masaki; Masaaki Saito, both of Yokohama, Japan

[73] Assignee: Nissan Motor Company, Ltd., Japan

[21] Appl. No.: 727,788

[22] Filed: Sep. 29, 1976

Related U.S. Application Data

[62] Division of Ser. No. 437,157, Jan. 28, 1974, Pat. No. 4,005,693.

[30] Foreign Application Priority Data

Jan. 29, 1973   Japan .................................. 48-11697

[51] Int. Cl.² ............................................. F02M 31/00
[52] U.S. Cl. ........................... 123/122 R; 123/122 D; 123/122 H; 123/41.02; 123/41.12; 123/142.5 R
[58] Field of Search ........... 123/117 R, 119 F, 122 D, 123/122 AA, 122 A, 122 R, 122 H, 142.5 R, 103 R, 41.02, 41.05, 41.11, 41.12

[56] References Cited

U.S. PATENT DOCUMENTS

| 2,877,751 | 3/1959 | Johnston ........................... 123/41.12 |
| 2,879,870 | 3/1959 | McColl ............................. 123/41.12 |
| 3,791,358 | 2/1974 | Massaki ........................... 123/119 F |

Primary Examiner—Ronald H. Lazarus

[57] ABSTRACT

A combustible mixture fed into the engine is heated by engine exhaust gases, the throttle valve is forcefully opened, ignition timing of the engine is retarded, cooling of the engine coolant and circulation thereof through the cooling circuit is interrupted and intake air is heated by exhaust gases during cold engine operation.

3 Claims, 2 Drawing Figures

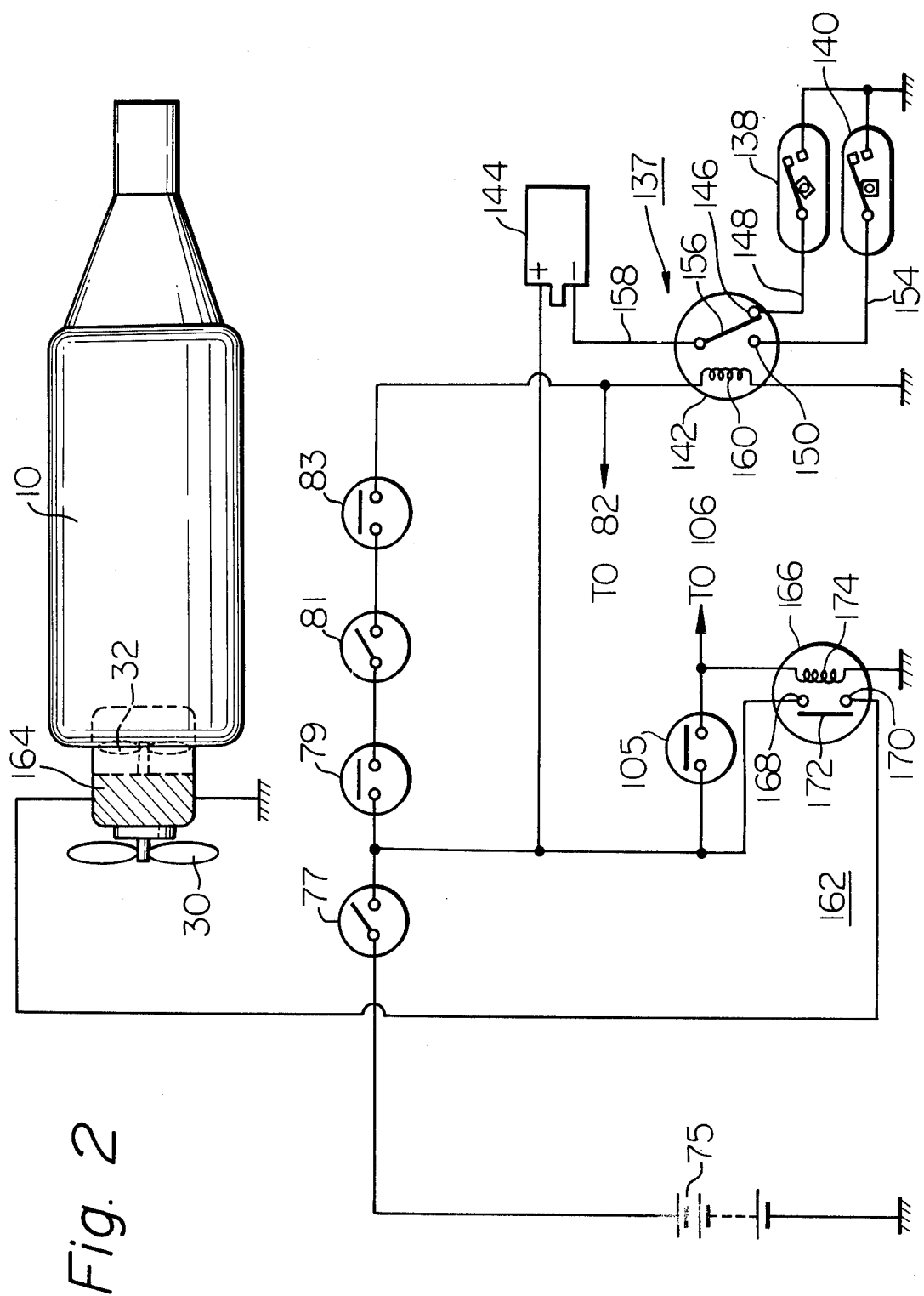

WARMING-UP SYSTEM FOR INTERNAL COMBUSTION ENGINES

This is a division of application Ser. No. 437,157, filed Jan. 28, 1974 now U.S. Pat. No. 4,005,693.

The present invention relates generally to an internal combustion engine and particularly to a warming-up system for use in an internal combustion engine.

As is well known in the art, a cold internal combustion engine emits exhaust gases containing a large amount of noxious ingredients such as hydrocarbons (HC's) and carbon monoxide (CO) which contaminate the atmosphere until the engine has warmed up. Accordingly, reduction in the period required of the engine to warm up results in reduction or elimination of the total amount of air pollutants in engine exhaust gases.

It is, therefore, an object of the invention to provide a warming-up system for use in an internal combustion engine which is adapted to rapidly warm up a cold engine.

It is a further object of the invention to provide a warming-up system for use in an internal combustion engine which is adapted to maximize combustion efficiency of a combustible mixture during the engine warming up period.

These and other objects, features and advantages of the invention will become apparent from the following description taken in conjunction with the accompanying drawings, wherein:

FIG. 1 is a schematic cross sectional view of one part of a preferred embodiment of a warming-up system according to the invention connected to an internal combustion engine; and FIG. 2 is a schematic view of the other part of the above-mentioned preferred embodiment.

Referring now to FIGS. 1 and 2, an engine 10 is shown to include, as customary, an air cleaner 12 having a cleaning element or filter 14, the cleaner 12 being vented to the open air through an air inlet pipe 16, an intake passageway 18 communicating with the air cleaner 12 and with an engine combustion chamber (not shown), a carburetor 20 through which the intake passageway passes and which has a venturi section 22 formed in the intake passageway 18 and a throttle valve 24 rotatably mounted therein, an exhaust gas passageway 26 communicating with the engine combustion chamber and vented to the open air through a silencer (not shown), a cooling fan 30 mounted on the engine 10 and serving to draw cooling air through a radiator (not shown) to cool the coolant therein and the engine 10. A pump 32 is mounted on the engine 10 to circulate engine coolant through an engine cooling circuit (not shown). The throttle valve 24 is manually operable to control the flow of combustible mixture passing through the intake passageway 18 in accordance with the torque or load demands of the engine 10. The air cleaner 12, intake passageway 18, and carburettor 20 form part of an intake system of the engine 10. The exhaust passageway 26 forms part of an exhaust system of the engine 10. The cooling fan 30 and pump 32 may be driven by any suitable drive means such as the engine 10 or an electric motor.

The warming-up system for rapidly warming up a cold engine 10 comprises a throttle valve control device 36 which serves to effect a forced opening of the throttle valve 24 during the engine warm-up operation. The device 36 comprises a first serve unit 38 including a housing 40 having a pair of housing members 42 and 44 which coact to peripherally clamp a flexible diaphragm 46 therebetween. The diaphragm 46 divides the housing 40 into an atmospheric chamber 48 vented to the open air and a vacuum chamber 50 communicating with the intake passageway 18 downstream of the throttle valve 24. The diaphragm 46 is operatively connected to a throttle valve shaft 52 through a link rod 54 and a link lever 56. A first valve 58 is interposed between the vacuum chamber 50 and the intake passageway 18. The first valve 58 includes a valve body 60 having a chamber 62 formed therein, an inlet port 64 formed through said valve body 60 and opening into the chamber 62 and communicating with the intake passageway 18 downstream of the throttle valve 24 through conduits 66 and 68 and an outlet port 70 formed through said valve body 60 and opening into the chamber 62 and communicating with the vacuum chamber 50 through a conduit 72, a valve element 74 movably accommodated in the chamber 62, a compression spring 80 biasing the valve element 74, and a first solenoid coil 82 for controlling the valve element 74. The valve element 74 is normally held in a position to close the inlet port 64 by the action of the spring 80 when the first solenoid coil 82 is de-energized and is moved to a position to open the inlet port 64 by electromagnetic force of the first solenoid coil 82 against the action of the spring 80 when the solenoid coil 82 is energized during cold operation of the engine 10. The throttle valve 24 is controlled as usual by an accelerator pedal (not shown) when the valve element 74 closes the inlet port 64 and is turned from a closed position in open direction by the first servo unit 38 when the valve element 74 opens the inlet port 64 during cold operation of the engine 10. The first solenoid coil 82 is connected to an electric control circuit including a source 75 of electric power such as a battery, an ignition switch 77 for the engine 10, a vehicle speed responsive switch 79, an accelerator switch 81 and a catalyst temperature responsive switch 83 which are connected in series to each other. The switch 79 is opened when a vehicle (not shown) having the engine 10 moves and closed when the vehicle stops. The switch 81 is opened when the accelerator pedal is depressed and closed when the accelerator pedal is released. The switch 83 is responsive to the variation in the temperature of a catalyst in a catalytic converter (not shown) in the exhaust pipe of the engine 10 through, for example, a bimetallic member and is closed when the temperature of the catalyst is below a predetermined level which may be about 300° C.

The warming-up system also comprises a combustible mixture heating device 84 which serves to heat a combustible mixture fed into the engine combustion chamber by heat of engine exhaust gases during cold operation of the engine 10. The device 84 comprises an exhaust gas valve 86 rotatably mounted in the exhaust gas passageway 26, an exhaust gas by-pass passageway 88 extending from a position upstream of the exhaust valve 86 to a position downstream thereof, a second servo unit 90 for controlling the exhaust gas valve 86 and a second valve 92 for controlling the second servo unit 90. The second servo unit 90 and second valve 92 are substantially identical in construction and operation with the first servo unit 38 and first valve 58, respectively. Thus, a detail description of elements 90 and 92 is herein omitted. A flexible diaphragm 93 of the second servo unit 90 is operatively connected to a rotatable shaft 94 of the exhaust gas valve 86 through a link rod 96 and a link lever 98. An inlet port 99 of the second valve 92 is controlled by a valve element 107 and communicates with the conduit 68 through a conduit 100. An outlet port 101 of the second valve 92 communicates with a vacuum chamber 102 of the second servo unit 90 through conduits 103 and 104. A second solenoid coil 106 of the second valve 92 is electrically connected to a switch 105 which is responsive to variations in temperature of the engine coolant and is connected to switches 77 and 79 also. The switch 105 is closed when the temperature of the engine coolant is below a predetermined level which may be about 60° C. The exhaust gas valve 86 is normally held in a position to fully open the exhaust gas passageway 26 when the solenoid coil 106 is de-energized and is moved from its fully open position in the direction to close or choke the exhaust gas passageway 26 to divert engine exhaust gases into the exhaust gas by-pass passageway 88 when the solenoid coil 106 is energized during cold operation of the engine 10. The exhaust gas by-pass passageway 88 and the intake passageway 18 share a common wall 108 and are separated within a limited section by the common wall 108. The wall 108 is heated by engine exhaust gases flowing through the exhaust gas by-pass passageway 88 and serves as a radiator or heat exchanger to heat the combustible mixture passing through the intake passageway 18 when the exhaust gas valve 86 is closed or chokes the exhaust gas passageway 26 during cold engine operation. The wall 108 has a higher heating effect, where it is formed at an elbow section of the intake passageway 18 against which the flow of a rather poor dispersion of the combustible mixture strikes to promote forming a fine dispersion of fuel in air, as shown in FIG. 1. The wall 108 may be made of a good conductor of heat such as copper. The wall 108 may also have formed thereon a plurality of fins 110 to increase the heating surface area of the wall 108 to enhance the heating effect. The intake passageway 18 may have formed therein an extension 112 which extends from the carburettor 20 to a position adjacent to the wall 108 to feed a combustible mixture thereto.

The warming-up system also comprises an intake air heater 114 to heat intake air fed to the carburettor 20 by engine exhaust during warm-up operation of the engine 10. The device 114 comprises a second air inlet pipe 118 in jacket form surrounding a section of the exhaust gas passageway 26 and exhaust gas by-pass passageway 88 and to have ends 119 and 119′ opening into the atmosphere. A wall 121 of the passageways 26 and 88 surrounded by the air inlet pipe 118 is heated by engine exhaust gases passing through the passageways 26 and 88 and serves as a heater or heat exchanging means to heat air drawn through the jacket 118. The wall 121 may have formed thereon a plurality of fins 122 to increase the heating surface area of the wall. The second air inlet pipe 118 communicates with the air inlet pipe 16 through a connecting pipe 124. A valve 126 is interposed between the pipes 16 and 124 to switch over supply to the air cleaner 12 from cold air by way of the pipe 16 to heated air by way of the pipes 124 and 118. A third servo unit 128 is provided for controlling the valve 126. The third serve unit 128 is substantially identical in construction and operation with the first servo unit 38. Thus, a detail description is omitted herein. A flexible diaphragm 130 of the third servo unit 128 is operatively connected to the valve 126 through a rod 132. A vacuum chamber 134 of the third servo unit 128 communicates through a conduit 136 with the conduit 103. The valve 126 normally closes the pipe 124 so as to supply the air cleaner 12 with cold air by way of the pipe 16 when the solenoid coil 106 is de-energized and is caused by the third servo unit 128 to open the pipe 124 and to close the pipe 16 so as to supply the air cleaner 12 with heated air by way of the pipes 124 and 118 when the second solenoid coil 106 is energized during cold operation of the engine 10.

The warming-up system also includes an ignition timing change-over device 137 comprising an advancing breaker contact assembly 138 in which ignition timing of the engine 10 is set at a usual advance angle, a retarding breaker contact assembly 140 in which the ignition timing is set at a retarded angle and a relay 142 which serves to switch over the connection between an ignition coil 144 of the engine 10 and either the advancing or retarding breaker contact assemblies 138 and 140. The relay 142 includes a first stationary contact 146 connected to the advancing breaker contact assembly 138 through a line 148, a second stationary contact 150 connected to the retarding breaker contact assembly 140 through a line 154, a switch arm 156 normally engaging the first contact 146 to connect the line 148 and a line 158 connected to the ignition coil 144 to connect the advancing breaker contact assembly 138 and the ignition coil 144, and a relay coil 160 connected to the switch 83. The ignition coil 144 is connected to the switches 77 and 79. The relay coil 160 is energized to engage the switch arm 156 with the second contact 150 to connect the retarding breaker contact assembly 140 and the ignition coil 144 to retard ignition timing of the engine 10 when the switch 83 is closed and the engine 10 is idling.

The warming-up system also includes an engine cooling system control device 162 which comprises an electromagnetic clutch 164 normally connecting the cooling fan 30 and pump 32 to the drive means and a relay 166 which serves to control the connection between the cooling fan 30 and pump 32 and the drive means. The relay 166 includes a first stationary contact 168 connected to the switching 77 and 79, a second stationary contact 170 connected to the electromagnetic clutch 164, a switch arm 172 normally disengaged from the stationary contacts 168 and 170, and a relay coil i 174 connected to the switch 105 and the solenoid coil 106. The electromagnetic clutch 164 is demagnetized to disconnect the cooling fan 30 and pump 32 from the drive means to render the cooling fan 30 and pump 32 inoperative when the relay coil 174 is energized to engage the switch arm 172 with the stationary contacts 168 and 170.

When, in operation, the engine 10 is started and idling when cold with the switches 77, 79 and 81 closed and the temperature of the catalyst below a predetermined level with the switch 83 closed, an electric control circuit is completed to energize the first solenoid coil 82 and the relay 142. Energization of the first solenoid coil 82 causes the valve element 74 of the first valve 58 to open the inlet port 64 to open communication of vacuum existing in the intake passageway 18 downstream of the throttle valve 24 with the vacuum chamber 50 of the first servo unit 38. The throttle valve 24 is opened a predetermined amount from its closed position in response to the difference between the pressures in the atmospheric and vacuum chambers 48 and 50 to increase the amount of combustible mixture drawn into the engine combustion chamber. As a result, the speed of the engine 10 is raised to increase the amount of engine exhaust gases and the temperature thereof. Thus, a rise in temperature of the engine 10 is promoted to shorten the period of the engine warm-up operation.

Energization of the relay 142 causes the switch arm 156 thereof to engage the second contact 150 to connect the ignition coil 144 to the retarding breaker contact assembly 140. Thus, ignition timing of the engine 10 is retarded to facilitate a rise in temperature of engine exhaust gases to shorten the period of the engine warm-up operation.

When the engine 10 is started and idling in a cold condition thereof and the temperature of the engine coolant is below a predetermined value with the switch 105 closed, another electric control circuit is completed to energize the second solenoid coil 106 and the relay 166. Energization of the second solenoid coil 106 opens the inlet port 99 of the valve 92 to unblock communication of vacuum existing in the intake passageway 18 downstream of the throttle valve 24 with the vacuum chamber 102 of the second servo unit 90 and the vacuum chamber 134 of the third servo unit 128. The exhaust gas valve 86 is actuated in response to the difference between the pressures in the vacuum and atmospheric chambers 102 and 109 to close or choke the exhaust gas passageway 26 to divert engine exhaust gases into the exhaust gas by-pass passageway 88. The wall 108 is heated by engine exhaust gases flowing through the exhaust by-pass passageway 88. The heated wall 108 heats the combustible mixture passing through the intake passageway 18 to enhance the gasification of fuel and mixing of fuel with air. Thus, the combustible mixture of sufficiently gasified fuel and air in which fuel is sufficiently mixed with air is drawn into the engine combustion chamber and efficiently burned. Accordingly, a rise in temperature of engine exhaust gases is promoted to hasten a rise in temperature of the engine 10. Concurrently, production of air pollutants such as hydrocarbons and carbon monoxide is reduced. An experiment indicated a fact that a choke valve could be fully opened about ten seconds after an engine was started from the cold condition thereof by employing a combustible mixture heating device according to the invention. Thus, the period of the engine warm-up operation is considerably shortened.

Meanwhile, the valve 126 is actuated in response to the difference between the pressures in the atmospheric and vacuum chambers 133 and 134 to open the pipe 124 and to close the pipe 16 to supply the air cleaner 12 with heated air through the pipes 124 and 118. Atmospheric air is drawn into the jacket 118 and heated by the wall 121 heated by engine exhaust gases flowing through the passageways 26 and 88. Heated air is drawn through the pipe 124 and air cleaner 12 into the carburettor 18 to be mixed with fuel therein. The mixing of heated air with fuel enhances gasification of fuel. Thus, the period of the engine warm-up operation is shortened and the production of air pollutants is reduced.

Energization of the relay 166 causes the electromagnetic clutch 164 to be demagnetized to render the cooling fan 30 and pump 32 inoperative to stop cooling of the engine coolant and engine 10 and circulation of the engine coolant through the engine cooling circuit. This results in a rise in temperature of the wall of the engine combustion chamber to enhance burning of fuel. Thus, the period of the engine warm-up operation is shortened and the production of air pollutants is reduced.

When the temperature of the catalyst reaches a predetermined level during cold and idling operations of the engine 10, the switch 83 is opened to de-energize the first solenoid coil 82 and relay 142. When the first solenoid coil 82 is deenergized, the valve element 74 returns to its closed position blocking the vacuum existing in the intake passageway 18 downstream of the throttle valve 24 from the vacuum chamber 50. The throttle valve 24 is thus controlled only by the accelerator pedal. Deenergization of the relay 142 causes the switch arm 156 to engage the first stationary contact 146 to connect the ignition coil 144 and the advancing breaker contact assembly 138 to advance ignition timing of the engine 10.

When the temperature of the engine coolant reaches a predetermined level during cold and idling operations of the engine 10, the switch 105 is closed to deenergize the second solenoid coil 106 and relay 166. When the second solenoid coil 106 is deenergized, the valve element 107 returns to its closed position blocking the vacuum existing in the intake passageway 18 downstream of the throttle valve 24 from the vacuum chambers 102 and 134 to deactuate the second and third servo units 90 and 128. Deactuation of the second servo unit 90 causes the exhaust gas valve 86 to return to its fully open position to completely open the exhaust passageway 26. The full opening of the exhaust passageway 26 ceases diversion of engine exhaust gases into the exhaust by-pass passageway 88 and to heat combustible mixture flowing in the intake passageway 18. Deactuation of the third servo unit 128 causes the valve 126 to return to its closed position to close the pipe 124 and to open the pipe 16. Closing of the pipe 124 ceases heated air to be drawn into the air cleaner 12. Opening of the pipe 16 causes only non-heated air to be drawn into the air cleaner 12. When the relay 166 is deenergized, the electromagnetic clutch 164 is magnetized to connect the engine cooling fan 30 and pump 32 to the drive means to resume cooling of the engine coolant and engine 10 and circulation of the engine coolant. Thus, the engine 10 is prevented from being over-heated.

It will be understood that reduction in the period of the engine warm-up operation and reduction or elimination of air pollutants are attained during the cold engine operation by employing one of the devices 36, 84, 114, 137 and 162 or a combination of at least two of the devices.

Even though the valves 58 and 92 have been described as solenoid valves, it will be understood that these valves may be of any electro-magnetic valve construction; and that the servo units 38, 90 and 128 herein described as standard diaphragm units may be of any vacuum responsive construction as long as they may function as herein described.

What is claimed is:

1. A warming-up system for an internal combustion engine, comprising an intake air heater comprising enclosure means vented to the atmosphere and communicable with the engine intake passageway and surrounding a limited portion of the engine exhaust gas passageway to heat atmospheric air in said enclosure means with heat of engine exhaust gas, and a first valve which normally obstructs communication between the engine intake passageway and said enclosure means and which provides communication between the engine intake passageway and said enclosure means during operation of the engine when cold, an ignition timing change-over device comprising an advancing breaker contract assembly normally connected to an ignition coil of the engine, a retarding breaker contact assembly normally disconnected from said ignition coil, and control means for changing over ignition timing of the engine to disconnect said advancing breaker contact assembly and said ignition coil and to connect said retarding breaker contact assembly and said ignition coil during operation of the engine when cold, and an engine cooling system control device comprising an electromagnetic clutch normally connecting an engine cooling fan and an engine coolant pump to drive means, and control means for demagnetizing said electromagnetic clutch to disconnect said engine cooling fan and said engine coolant pump from said drive means during operation of the engine when cold.

2. A warming-up system as claimed in claim 1, in which said control means of said engine cooling system control device comprises a relay electrically connected to said electromagnetic clutch and to a switch which is responsive to the temperature of an engine coolant and which is closed when the temperature of said engine coolant is below a predetermined level, said relay being energized to demagnetize said electromagnetic clutch when said switch is closed.

3. A warming-up system for an internal combustion engine, comprising an intake air heater comprising enclosure means vented to the atmosphere and communicable with the engine intake passageway and surrounding a limited portion of the engine exhaust gas passageway to heat atmospheric air in said enclosure means with heat of engine exhaust gas, and a first valve which normally obstructs communication between the engine intake passageway and said enclosure means and which provides communication between the engine intake passageway and said enclosure means during operation of the engine when cold, a throttle valve in the engine intake passageway, a combustible mixture heating device comprising an exhaust gas by-pass passageway communicating at both ends with the engine exhaust gas passageway and sharing a common heat transfer wall with the engine intake passageway downstream of the engine throttle valve through which wall engine exhaust gas heats a combustible mixture passing through the engine intake passageway when diverged into said by-pass passageway during operation of the engine when cold, a throttle valve control device comprising a servo unit having a diaphragm operatively connected to the engine throttle valve to turn it from a closed position to a partially open position in response to a vacuum existing in the engine intake passageway downstream of the engine throttle valve during operation of the engine when cold, an ignition timing changeover device comprising an advancing breaker contact assembly normally connected to an ignition coil of the engine, a retarding breaker contact assembly normally disconnected from said ignition coil, and control means for changing over ignition timing of the engine to disconnect said advancing breaker contact assembly and said ignition coil and to connect said retarding breaker contact assembly and said ignition coil during operation of the engine when cold, and an engine cooling system control device comprising an electromagnetic clutch normally connecting an engine cooling fan and an engine coolant pump to drive means, and control means for demagnetizing said electromagnetic clutch to disconnect said engine cooling fan and said engine coolant pump from said drive means during operation of the engine when cold.

* * * * *